(12) United States Patent
Hannah et al.

(10) Patent No.: US 6,738,105 B1
(45) Date of Patent: May 18, 2004

(54) COHERENT LIGHT DESPECKLING (75) Inventors: Eric C. Hannah, Pebble Beach, CA (US); Michael O'Connor, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 601 days.

(21) Appl. No.: 09/706,494

(22) Filed: Nov. 2, 2000

(51) Int. Cl.[7] .............................. H04N 9/12; H04N 5/74
(52) U.S. Cl. ...................... 348/745; 348/750; 348/756; 359/279; 359/237; 398/188
(58) Field of Search ................................. 348/745, 740, 348/750, 744, 746, 756, 758, 759, 835, 557, 607; 350/10, 11, 279, 229, 237; 398/188, 108; 345/7, 32; 340/242, 245, 246; 353/122, 69; 372/26, 21

(56) References Cited

U.S. PATENT DOCUMENTS

| | | | |
|---|---|---|---|
| 3,652,956 A | * 3/1972 | Pinnow et al. | 359/278 |
| 3,891,300 A | * 6/1975 | Tsunoda | 359/29 |
| 3,917,380 A | * 11/1975 | Kato et al. | 359/35 |
| 4,783,753 A | * 11/1988 | Crimmins | 382/275 |
| 5,093,563 A | * 3/1992 | Small et al. | 250/201.9 |
| 5,272,473 A | * 12/1993 | Thompson et al. | 345/7 |
| 5,398,130 A | * 3/1995 | Redman | 398/198 |
| 5,416,628 A | * 5/1995 | Betti et al. | 398/185 |
| 5,459,532 A | * 10/1995 | Baba | 348/745 |
| 5,566,382 A | * 10/1996 | Worchesky et al. | 359/237 |
| 5,748,311 A | * 5/1998 | Hamann et al. | 356/336 |
| 5,892,607 A | * 4/1999 | Atlas | 398/201 |
| 5,912,755 A | * 6/1999 | Bergano | 398/185 |
| 6,154,259 A | * 11/2000 | Hargis et al. | 348/756 |
| 6,191,880 B1 | * 2/2001 | Schuster | 359/238 |
| 6,252,693 B1 | * 6/2001 | Blauvelt | 398/194 |
| 6,323,984 B1 | * 11/2001 | Trisnadi | 359/245 |
| 6,424,412 B1 | * 7/2002 | Matthews | 356/152.1 |
| 6,490,071 B2 | * 12/2002 | Logan, Jr. et al. | 398/194 |

OTHER PUBLICATIONS

Toshiaki Iwai et al., Speckle Reduction in Coherent Information Processing, May 1996, Processing of the IEEE, vol. 84, No. 5.*

Theophano Mitsa, Kevin J. Parker; "Digital Halftoning Using A Blue Noise Mask", IEEE, 1991, pp. 2809–2812, USA.

Robert A. Ulichney, "Dithering with Blue Noise", Proceedings of the IEEE Jan. 1988, pp. 56–79, vol. 76, No. 1, USA.

* cited by examiner

Primary Examiner—Michael H. Lee
Assistant Examiner—Jean W. Désir
(74) Attorney, Agent, or Firm—Trop, Pruner & Hu, P.C.

(57) ABSTRACT

A display device or a receiver device for use with coherent light. A controller applies phase shift values to a multi-region phase array at a frequency sufficiently higher than the flicker fusion rate of the human eye or other intended receiver in order to remove the perception of speckling artifacts which would otherwise appear due to the coherency of the light.

44 Claims, 7 Drawing Sheets

COHERENT LIGHT DESPECKLING

RELATED APPLICATION

U.S. patent application Ser. No. 09/706,502 entitled "Quantum Random Number Generator" co-pending herewith and filed by Eric C. Hannah, co-inventor hereof.

BACKGROUND OF THE INVENTION

1. Technical Field of the Invention

The present invention relates to removal of low-frequency pattern content from coherent light to avoid the perception of speckling.

2. Background Art

A coherent light beam will exhibit interference fringes if there are plural propagation paths that the light can take from the light source to the display device. Imaging systems use focusing elements such as lenses, mirrors, and the like to direct light onto a display device. Each of these lenses etc. may offer a vast number of propagation paths for the light to reach any given display surface location or pixel. This problem is very analogous to the familiar dual-slit wave/particle interference experiments from basic physics. In a two-dimensional display, these interference paths are exhibited as speckles, which resemble bright spots or "snow", noise which is familiar from poor broadcast television reception.

The human eye has a flicker fusion rate of approximately 50 Hz to 60 Hz. Speckles which appear in different locations for sufficiently short periods of time will not be perceived as moving by the human eye, as the nervous system will fuse the flickering values at those particular retinal locations into a single distribution of perceived values. As the time-averaged speckle image will have low average surface brightness the result will be a dim background image that is easily ignored.

The human eye is very sensitive to coherent structures that vary in time. A simple example is a tiger moving through tall grass. If the tiger remains stationary, our eye has a difficult time discerning the tiger, due to his camouflaged pattern. But if the tiger is moving, our eye will discern the systematic disturbance of the pattern, even if the grass is, itself, moving in a strong wind—it is not the movement which is perceived in this case, it is the structural disturbance in which a low-frequency pattern (the tiger's stripes) is injected into the overall image.

A problem, similar to reducing coherent light speckling, occurs in the field of halftone printing. Halftone printing represents a continuous gray-scale image via a fixed-grid pattern of purely black, fixed sized dots. Ideally, the eye will perceive the intended gray level by fusing the dots and white background into a lower resolution retinal image. Many half-toning algorithms are known, but they suffer from varying degrees of artifacting, such as banding, in which the eye perceives extra structure in the dots. The eye is very sensitive to such structural features. Patterns can be removed from our perception by removing coherent, low-spatial frequency structure from the source.

Early half-toning algorithms used white noise to randomize the dots. White noise contains generally equal content from low frequencies, medium frequencies, and high frequencies. White noise can be filtered to emphasize or eliminate certain components. Blue noise contains more high-frequency content than medium-frequency and low-frequency content; by way of contrast, pink noise emphasizes the lower frequencies. For purposes of this patent, blue noise should be understood to mean noise which has sufficiently little low-frequency content that it is not interesting to or not perceived by the human eye or, more generically, by the video perception apparatus of the intended audience, whether human or machine. It may be thought of as "anti-pattern".

In the field of half-tone printing, researchers have discussed using blue noise to overcome banding in halftone printing; Robert A. Ulichney, "Dithering with blue noise", Proc. EEE, vol. 76, no. 1, p. 56, January 1988; and Theophano Mitsa and Kevin J Parker, "Digital halftoning using a blue noise mask", ICASSP, 91: 1991 International Conference on Acoustics, Speech, and Signal Processing, pages 2809–2812, Toronto, Canada, May 1991 (WEEE).

Figure 1:
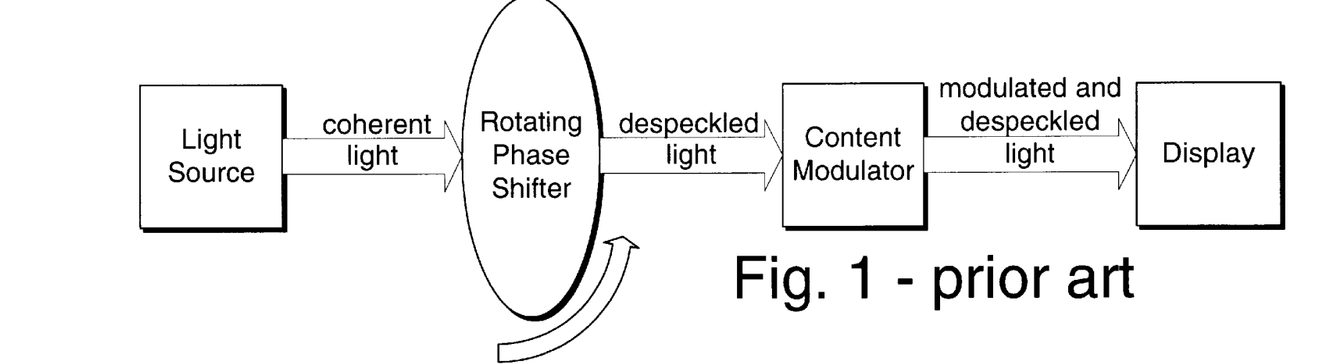
FIG. 1 shows the prior art system of removing speckling by using a rotating plate.

FIG. 1 shows a despeckling system used in a video display. Light from a coherent light source was passed through a phase shift plate, and the phase shift plate was mechanically rotated. To achieve despeckling, the phase shift plate needed to have varying phase shift characteristics at different portions of its surface, and the plate needed to be rotated fast enough that any given such portion of its surface was within one display pixel's worth of the light beam for a period of time less than the flicker fusion time of the human eye.

There are some problems with this solution. For one, the perimeter of the plate has a greater rotational velocity than the center of the plate; thus, portions of the image that pass through the plate near its center may receive less despeckling than portions which pass through the perimeter. That portion of the light which passes through the rotational center of the plate will receive essentially zero despeckling; in order to avoid that, it would be necessary to use a plate having a diameter more than twice the diameter of the light beam at that location—so the entire image could be passed through the plate off to the side of the rotational center—which results in a larger overall display system, a larger and more expensive plate, and larger and more expensive rotation mechanism. Another alternative might be to oscillate the rotating plate so it does not have a consistent rotational center, but that would introduce undesirable mechanical problems such as vibration.

Neither the halftone printing art nor this prior art despeckling system makes any mention or use of blue noise characteristics for despeckling. Indeed, the distribution and characteristics of the phase shifting characteristics of respective regions of the rotating plate are not described in terms of even white noise (with its undesirable low frequency pink noise component), much less blue noise.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only. In the interests of making the drawings more readily understandable, lenses and other optics have been omitted from the drawings. Those of skill in the art will understand where such elements may be utilized in conjunction with the illustrated components of the invention.

DETAILED DESCRIPTION

Figure 2:
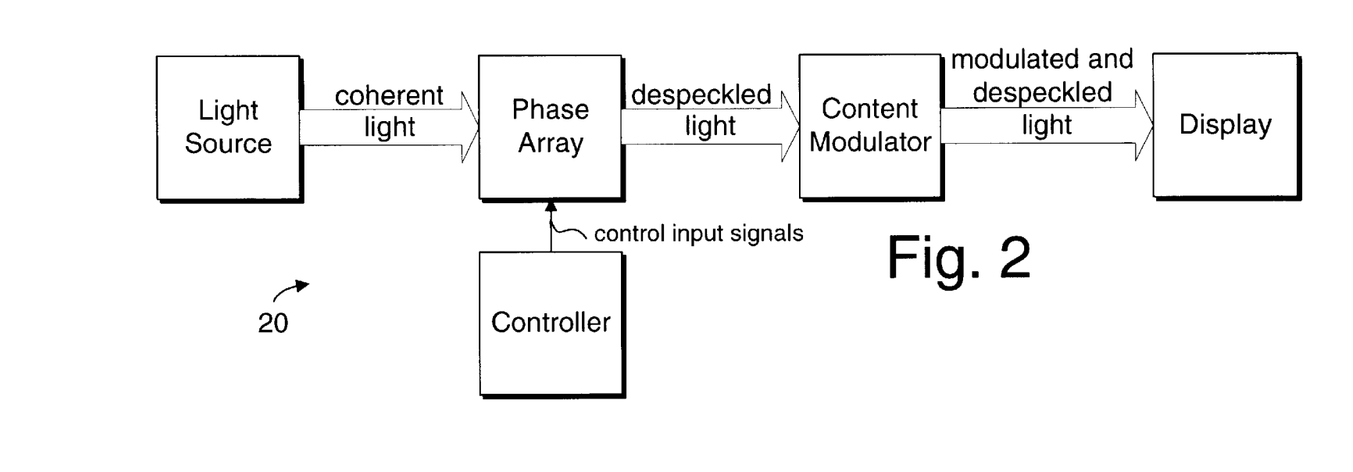
FIG. 2 shows one embodiment of this invention, including the phase array and its controller, in which the light is despeckled before content is inserted.

FIG. 2 shows a display system 20 according to one embodiment of this invention. The display system may be any display system in which a coherent light source is employed, including but not limited to: televisions, display televisions, computer monitors, projectors, movie theater projectors, direct-to-eye projectors, head-up displays, and the like.

The light source may provide only one base color for the system, such as red, or it may provide a plurality of colors. One example of a suitable light source is a laser. The light source may be the sole light source in the display system, or it can be used in conjunction with other light sources that may, themselves, be coherent or non-coherent.

Light from the light source may exhibit coherency in one or more dimensions, under one or more conditions, or at one or more times. It is not necessary that the light actually exhibit coherency at all times, nor under all conditions, nor that coherency would cause speckling which is visible to all people, in order for this invention to be desirable.

The light from the light source is cleaned up using a phase modulator such as a phase array, under the control of a controller.

Figure 3:
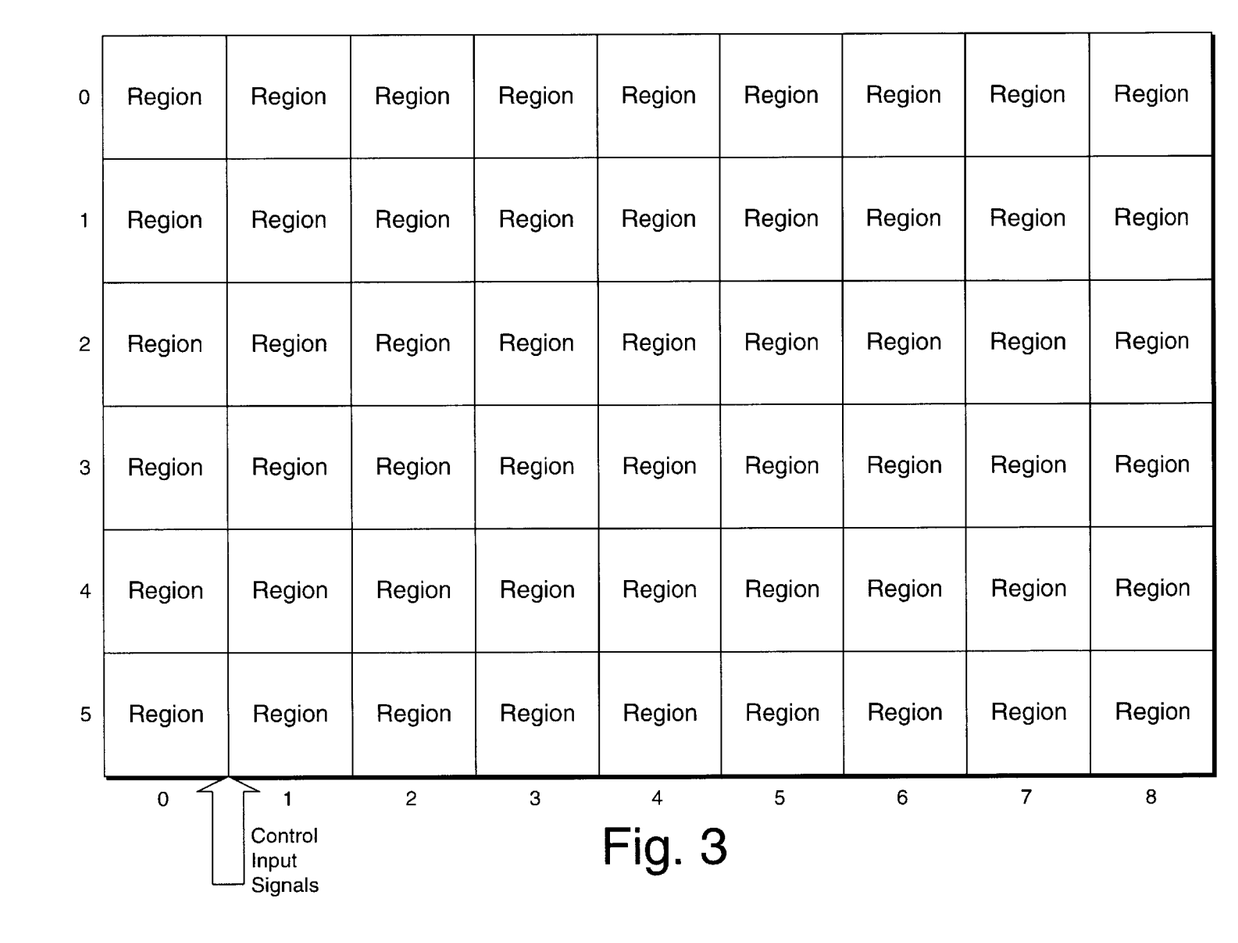
FIG. 3 shows one example of a phase array, employing a rectangular or square grid array.

FIG. 3 illustrates one embodiment of the phase array, in which the phase array includes a plurality of four-sided regions arranged in a rectangular pattern of rows labeled 0 through 5 and columns labeled 0 through 8.

Figure 4:
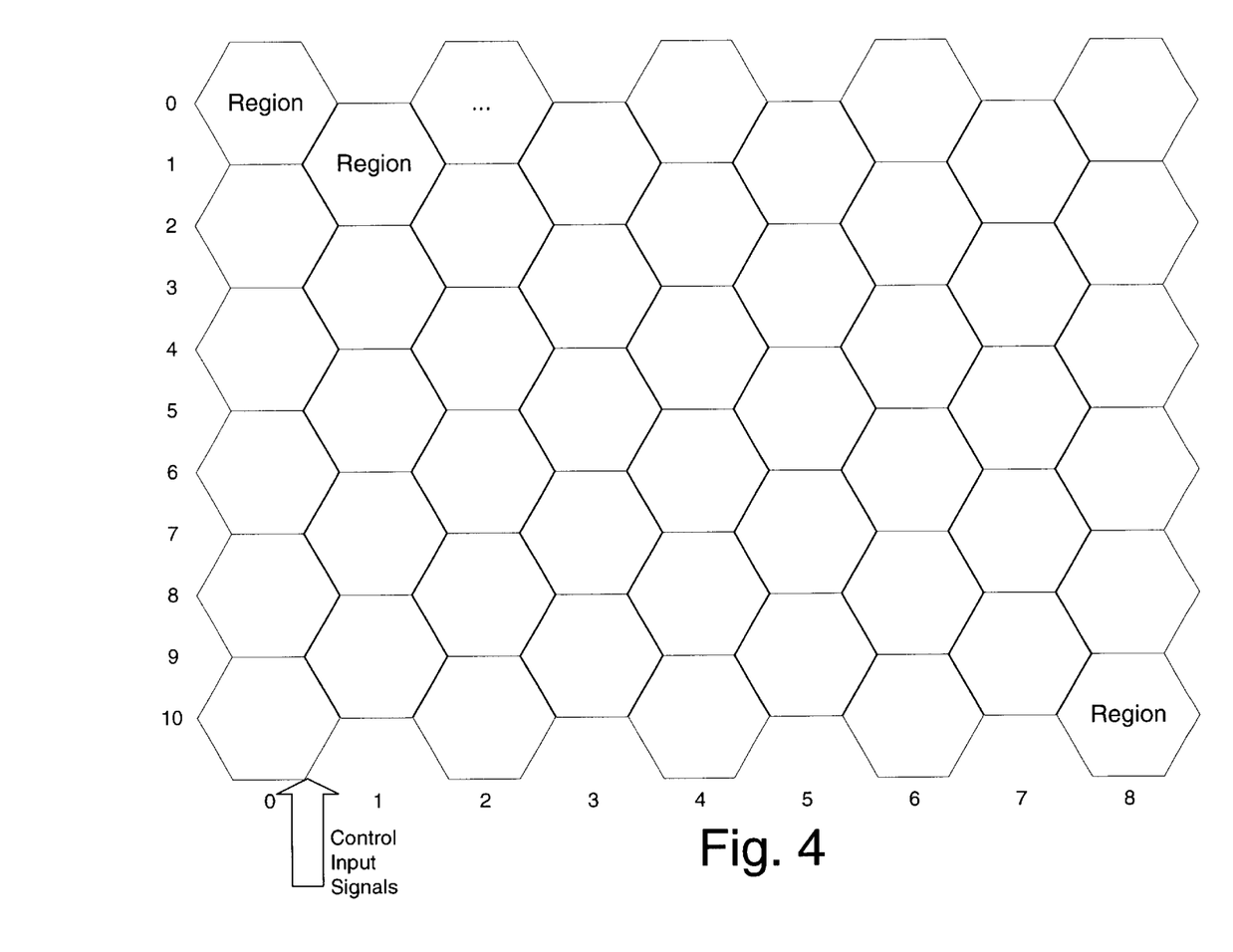
FIG. 4 shows another example of a phase array, employing a honeycomb grid array.

FIG. 4 illustrates another embodiment of the phase array, in which the phase array includes a plurality of six-sided regions arranged in a honeycomb pattern of rows labeled 0 through 10 and columns labeled 0 through 8, wherein the even numbered rows contain regions only in the even numbered columns, and the odd numbered rows contain regions only in the odd numbered columns.

Figure 5:
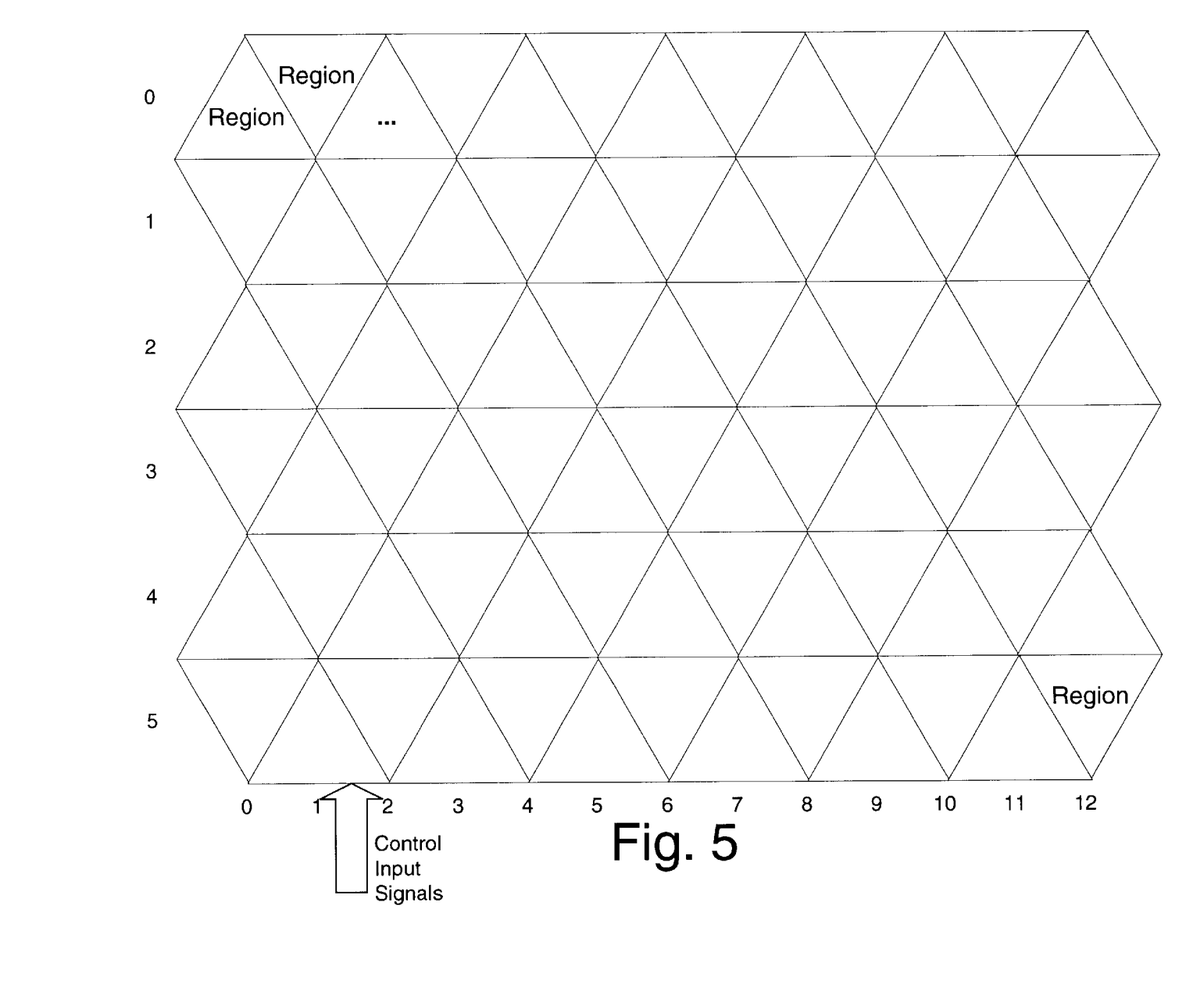
FIG. 5 shows another example of a phase array, employing a triangular grid array.

FIG. 5 illustrates another embodiment of the phase array, in which the phase array includes a plurality of three-sided regions arranged in a pattern of rows labeled 0 through 5 and columns labeled 0 through 12.

The reader will understand that the row and column numbering systems shown in FIGS. 3–5 are illustrative only, and that the addressing scheme or other characteristics of the control input values are not necessarily limited to such numbering schemes. Indeed, the regions could be arranged randomly. The regions are not necessarily the same size, although that may be one suitable manufacturing alternative. Armed with the teachings of this patent, the application developer will be able to select an arrangement of regions suitable to the particular application at hand. In some applications, it may be desirable that the overall geometry of the phase array match the geometry of the content modulator (in size and/or in height:width ratio) and/or that of the display device.

Figure 11:
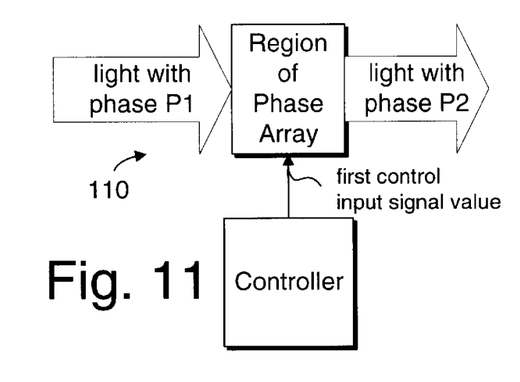
FIG. 11 shows one region of the phase array providing a first amount of phase shift in response to a first input control signal value, at a point in time.
Figure 12:
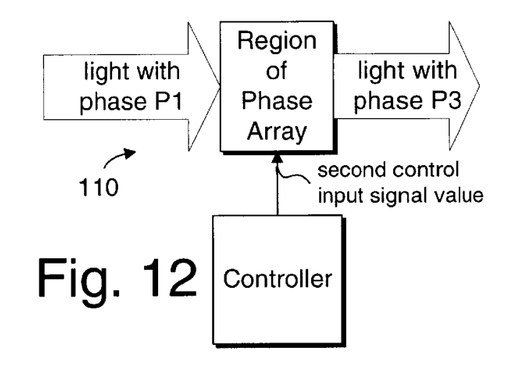
FIG. 12 shows that region of the phase array providing a second amount of phase shift in response to a second input control signal value, at a different time.

FIGS. 11 and 12 illustrate the variability of the phase shifting property of a region of the to phase array. At one point in time, such as shown in FIG. 11, the controller provides to the region a control input signal having a first value ("first input control signal value"), and in response to that value, the region provides a first amount of phase shifting (from phase P1 to phase P2) to that portion of the light which encounters the region. At a different point in time, illustrated in FIG. 12, the controller provides to the region a different, second value on the control input signal, and in response to that second value, the region provides a second amount of phase shifting (from phase P1 to phase P1 to phase P3). It should be understood that the respective phases P1 shown in FIG. 11 and FIG. 12 are not necessarily the same; what should be understood is that the difference between P2 and P1 in FIG. 11 is not the same as than the difference between P3 and P1 in FIG. 12.

Figure 9:
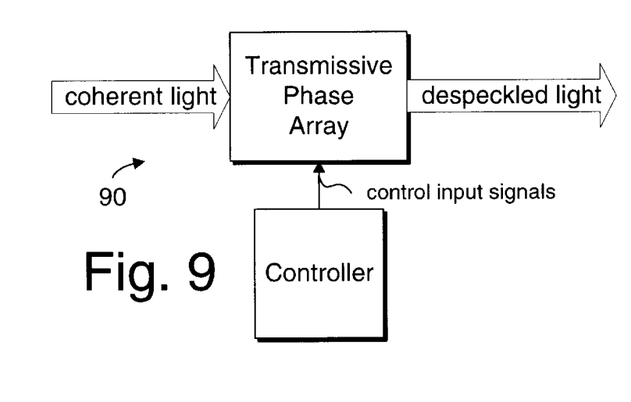
FIG. 9 illustrates use of a transmissive phase array.

FIG. 9 illustrates an embodiment of the invention in which the controller provides control input signals to a transmissive phase array. In this embodiment, coherent light passes through the phase array and emerges as despeckled light.

Figure 10:
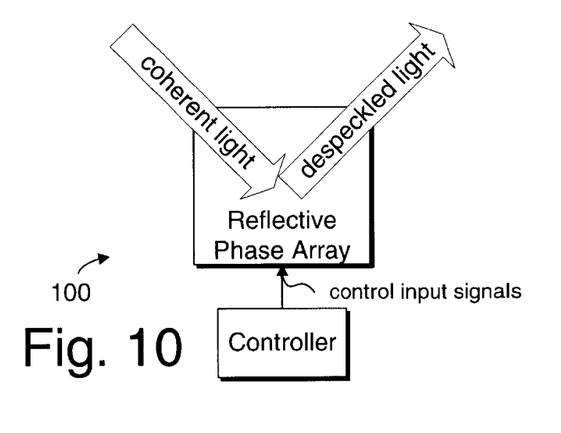
FIG. 10 illustrates use of a reflective phase array.

FIG. 10 illustrates an embodiment in which the controller provides control input signals to a reflective phase array. In this embodiment, coherent light is despeckled as it bounces off phase array.

Referring again to FIG. 3, the phase shift characteristics of a first region (such as the region in row 0 and column 0) and a second region (such as the region in row 2 and column 3) are separately controllable by the controller. In one embodiment, the controller might provide a series of addresses and values to the phase array, wherein an address specifies the particular region to which the corresponding value is to be applied. For example, the series of values provided over the control input signal channel might be "row 0 column zero phase shift amount 93, row 0 column 1 phase shift amount 27, . . . , row 5 column 8 phase shift amount 273". Alternatively, the addressing might be inherent rather than explicit, and the series of control input signal values might be "START 93 27 . . . 273". Alternatively, even the start or synchronization portion could be omitted, and the control input signal values could simply be a continuous sequence of phase shift values; in this embodiment, the controller might not even need to know how many regions are in-the phase array.

It is not strictly necessary that each and every region in the entire phase array be controllable completely independently from all other regions, although that may be the most desirable or at least the most flexible alternative. In other embodiments, a given control input signal could control a plurality of regions. For example, it may be in some applications that parts of the light beam which are far removed from each other in the cross-section of the beam are sufficiently unrelated such that controlling their corresponding phase array regions with the same input control value will not result in unacceptable speckling. This may be in some cases due to the respective parts of the light beam are sufficiently unlikely to end up taking paths to the same display location. In other cases, it may be due to variability in base phase shifting characteristics of the corresponding regions of the phase array, or in differences in the corresponding regions' respective phase shift sensitivity curves.

As one example, the phase array may apply a first received value to the region in row 0 column 0 and also to the region in row 3 column 8, then apply a second received value to the region in row 0 column 1 and also to the region in row 3 column 7. The n-ary pairing of such regions to receive same control input signal values may proceed in interlaced fashion, or random fashion, or other suitable fashion.

The controller may be coupled to the phase array via any suitable means, such as a serial or parallel bus or point-to-point connection, wired connection, wireless connection, optical connection, or other suitable means as the application dictates.

The controller may provide the control input values in digital or analog format, as the phase array requires. The control input values may be applied directly to the regions, or they may be used in conjunction with some other input value; for example, an input value for a region could be summed with the previous value applied to that region.

The sequence of input control signal values does not necessarily have to directly represent actual amounts of phase shifting. In some embodiments, the input control signal value could simply be a signal that causes an increment for each region's current value—in such implementations, it may be possible to implement effective control values by, for example, seeding each region with a unique starting value, then applying to each region in parallel a respective same value from a sequence of values, such that because each region started in a different state it will remain in a different state even though it has applied to it a same value as its neighbors. In some cases, the control input signal could simply be a clock signal that causes the phase array to update (e.g. increment) the phase shift amount of each region.

One salient feature of the controller is that it should not inject low-frequency pattern structure into the system, beyond some maximum acceptable limit that is dictated by the design goals of the overall system and the perception of the intended audience. Some systems may be more forgiving of such noise than others. Factors which may influence the threshold may include persistence of the display device, resolution of the display device, refresh rate of the display device, visual acuity of the intended audience, anticipated operating environment, system cost, and the like.

In some applications, it may be desirable to use random values for the control inputs to the phase array. One especially suitable source of such random data is a 2-D blue noise generator. One suitable embodiment may take quantum random numbers from the device disclosed in co-pending patent application entitled "Quantum Random Number Generator", and pass it through a filter that filters out any accidental low-frequency pattern noise to yield a blue noise data stream.

In some applications (such as that shown in FIG. 2), it is desirable to despeckle the light beam prior to the introduction of the video content into the beam.

Figure 7:
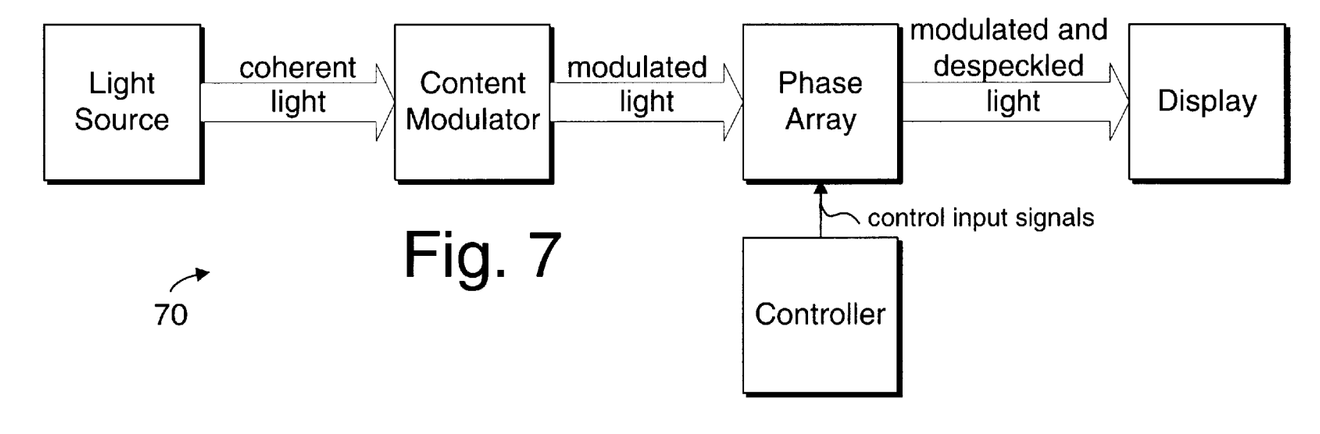
FIG. 7 shows an embodiment of the invention in which the light is despeckled after content is inserted.

FIG. 7 illustrates that the despeckling may be performed after the image content has been inserted.

The particular mechanism by which the content is inserted is not especially germane to an understanding of this invention, and thus has been represented generically by the box labeled "Content Modulator"; content insertion is well understood in the art.

Referring again to FIG. 2, after despeckling and content insertion, the despeckled image is displayed on a display device. In some applications, such as a computer monitor or a television screen, the display system may be an integral whole, including everything from the light source to the Display. In other applications, such as a theater projector, the actual display device (which could even be a wall) is not integral with the device that provides-the despeckled light beam. In some applications, even the content insertion device may be external to the despeckled light beam device. And in some applications, the despeckler (comprising the phase array and the controller) may itself be a stand-alone product. In fact, the controller and the phase array could themselves be manufactured separately, to permit system integrators greater flexibility.

By modulating the control input values at a suitably high frequency, despeckling is accomplished without having to rotate or otherwise move the phase array with respect to the light source. While some minor degree of oscillation or movement may be inherent in the system, such as from vibration caused by other components such as cooling fans, or perhaps even caused by external sources such as footsteps, the reader will understand that this motion of the phase array relative to the light beam it is operating upon is not a meaningful component of its despeckling characteristics. Indeed, it may be desirable to eliminate such motion as much as possible.

Figure 6:
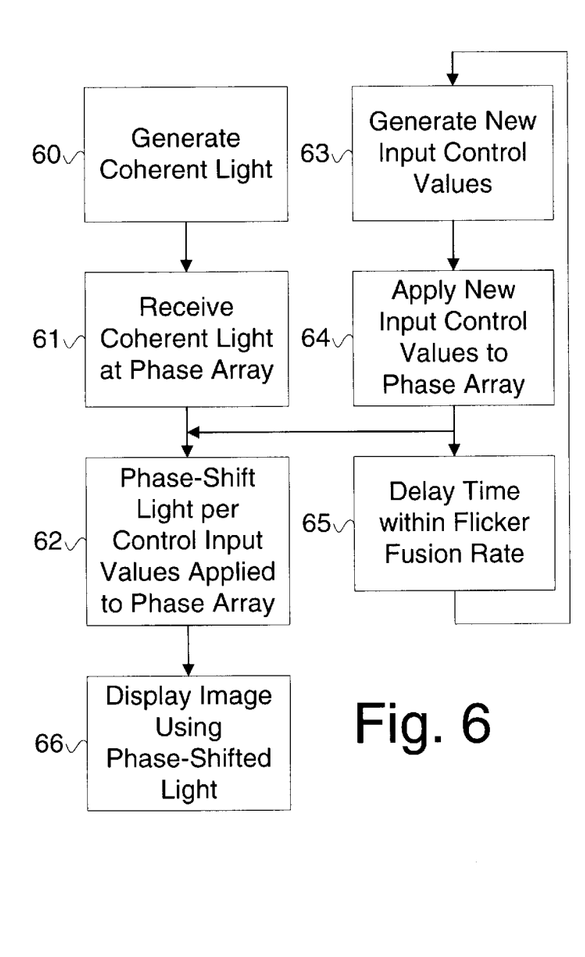
FIG. 6 illustrates a flowchart of one method of practicing this invention.

FIG. 6 illustrates one method according to this invention. Coherent light is generated (box 60), and received at a phase shift device such as a phase array having at least two independently-controllable regions (box 61). The individual regions of the phase array perform independent amounts of phase shifting upon light passing through them (box 62), according to respective control input values applied to them and generated by a controller (boxes 63, 64). In order to despeckle the light from the coherent light source, the controller generates new control input values and applies them to the phase array at a frequency (box 65) sufficiently within the flicker fusion rate of the human eye or other intended recipient. By applying this despeckling at a sufficiently high frequency, the image displayed on the display device (box 66) is perceived as being despeckled.

Figure 8:
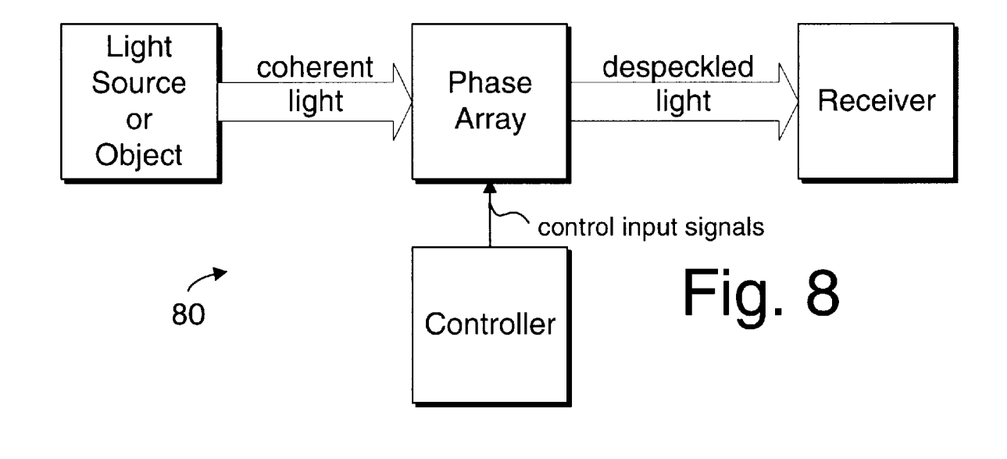
FIG. 8 shows an embodiment of the invention configured as a sensor or receiving apparatus rather than as a display apparatus.

FIG. 8 illustrates another alternative embodiment, in which the invention is used in an apparatus configured as a sensor or receiver, rather than as a display device. Light is provided by a light source or is reflected from an object (such as an enemy tank which is being illuminated by a guided-missile targeting laser). That light is coherent or contains a coherent component. Prior to the light being received at a receiver (such as a guided-missile targeting eye), the light is filtered through a phase array to despeckle the light. This may, in some cases, provide improved reception or improved usability of the light at the receiver device. As in the display embodiment, the phase array in the receiver embodiment is under control of a controller which provides appropriate control input signal values at a frequency suitable to remove speckling from the perception of the receiver.

Figure 13:
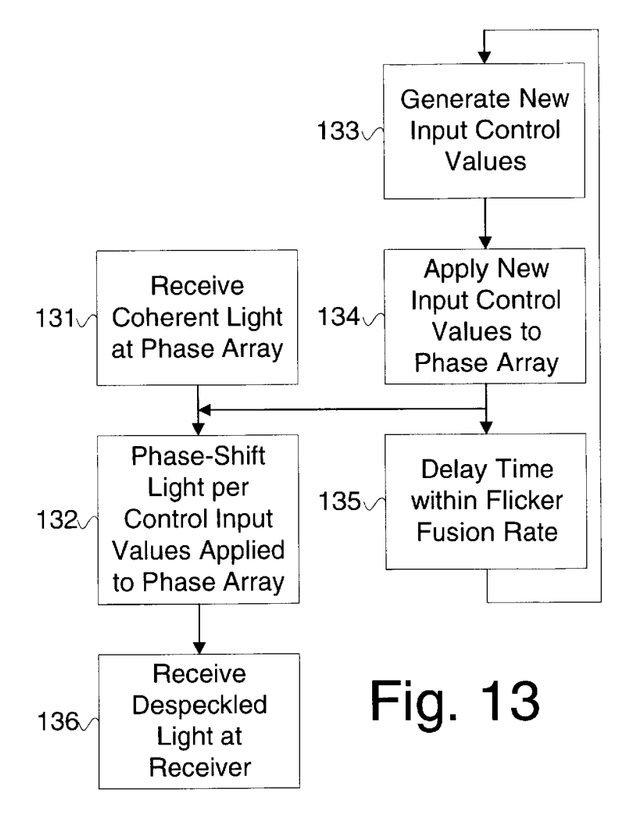
FIG. 13 illustrates a flowchart of a method of practicing an embodiment of the invention.

FIG. 13 illustrates a method of the invention as configured to be a receiver rather than a display device. Coherent light is received (box 131) at a phase shift device such as a phase array having at least two independently-controllable regions. The individual regions of the phase array perform independent amounts of phase shifting (box 132) upon light passing through them, according to respective control input values applied to them and generated by a controller (boxes 133, 134). In order to despeckle the light from the coherent light source, the controller generates new control input values and applies them to the phase array at a frequency (box 135) sufficiently within the flicker fusion rate of the receiver device (box 136).

Although this patent has, for convenience, referred to despeckling as it pertains to light in the human-visible spectrum, the principles of this invention could readily be applied to other spectra, such as the infrared, the ultraviolet, or x-rays, if there were to be discovered some need to provide despeckling in such applications. In such cases, the reader will understand that the relevant flicker fusion frequency may not be the same as for the human eye, and that the controller will provide control inputs to the phase array at a suitably higher or lower rate.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. An apparatus comprising:
   a phase modulator for despeckling an electromagnetic beam, the phase modulator having a plurality of regions which have individually controllable phase modulation; and
   a controller coupled to the phase modulator for providing a first phase modulation control input to a first of said regions and a second phase modulation control to a second of said regions.

2. The apparatus of claim 1 wherein the electromagnetic beam is a light beam in the visible spectrum, and the apparatus further comprising a light source for generating the light beam.

3. The apparatus of claim 2 wherein the light source is a laser.

4. The apparatus of claim 1 wherein the controller comprises a random number generator.

5. The apparatus of claim 4 wherein the random number generator comprises a quantum random number generator.

6. The apparatus of claim 5 wherein the random number generator further comprises a filter for removing pink noise content from sets of random numbers provided from the controller to the phase modulator.

7. The apparatus of claim 4 wherein the random number generator comprises a blue noise generator.

8. The apparatus of claim 1 wherein the phase modulator comprises a transmissive device.

9. The apparatus of claim 1 wherein the phase modulator comprises a reflective device.

10. The apparatus of claim 1 wherein the controller changes the phase modulation control inputs to each of the regions at a frequency sufficiently high that any speckles exist for a period which is short enough so as to be substantially masked by the flicker fusion rate of the human eye.

11. A light source comprising:
    a coherent light source;
    a phase modulator coupled to the coherent light source, the phase modulator including,
        a first region, and
        a second region; and
    a controller coupled to the phase modulator to apply first and second phase modulation controls to the first and second regions, respectively.

12. The light source of claim 11 wherein the phase modulator comprises a phase array.

13. The light source of claim 12 wherein the phase array has three-sided regions.

14. The light source of claim 12 wherein the phase array has four-sided regions.

15. The light source of claim 12 wherein the phase array has six-sided regions.

16. The light source of claim 11 wherein the phase modulator comprises more than ten regions and the controller applies a respective unique values to each respective region during a period of time.

17. The light source of claim 11 wherein the coherent light source provides light in a human-visible spectrum.

18. The light source of claim 11 wherein the coherent light source provides electromagnetic radiation not visible to humans.

19. The video display device of claim 11 further comprising a display screen, wherein the video display device is a television.

20. The video display device of claim 19 wherein the video display device is a projection television.

21. The video display device of claim 11 further comprising a display screen, wherein the video display device is a computer monitor.

22. The video display device of claim 11 wherein the video display device is a projector.

23. The video display device of claim 22 wherein the video display device is a movie theater projector.

24. The video display device of claim 22 wherein the video display device is a direct-to-eye projector.

25. A video display device comprising:
    a light source for generating a light beam which exhibits coherence across its cross-section;
    a phase shifter including,
        a plurality of regions each for receiving a portion of the light beam and for applying a respective phase shift to that portion of the light beam in response to a respective control input;
    a controller coupled to the phase shifter for generating the control inputs;
    means, coupled to receive the light beam, for modulating the light beam to insert a content image; and
    a display screen, coupled to receive, and for displaying the light beam with content image.

26. The video display device of claim 25 wherein the display screen is a television.

27. The video display device of claim 25 wherein the display screen is a projection television.

28. The video display device of claim 25 wherein the display screen is a computer monitor.

29. An apparatus comprising:

a source of coherent light;

a phase array coupled to receive the coherent light, and including a plurality of regions each capable of providing a respective amount of phase shift to light encountering that region; and a controller coupled to the phase array for providing control inputs to the phase array to vary the amount of phase shift of each region independently and at a frequency higher than the flicker fusion rate of the human eye.

30. The apparatus of claim 29 wherein the source is a laser.

31. The apparatus of claim 29 wherein the control inputs comprise values, including a unique digital value for each respective region of the phase array, and wherein the phase array uses a respective digital value to indicate the amount of phase shift to be provided by the respective, corresponding region.

32. The apparatus of claim 29 wherein the control inputs comprise analog signals.

33. The apparatus of claim 29 wherein:

the control inputs comprise, for each region, a respective value which does not directly indicate phase shift amounts of the respective region; and the phase array provides phase shifting of each region as a function of the control input for that region and of a previous phase shift amount of that region.

34. A method of displaying a video image, comprising:

generating coherent light;

receiving the coherent light at a phase array having a plurality of independently-controllable phase shift regions;

generating control input values; and applying the control input values to the phase shift regions.

35. The method of claim 34 further comprising:

at a frequency higher than a flicker fusion rate of a human eye, repeating, the generation of control input values to generate new control input values, and the application of the new control input values to the phase shift regions.

36. The method of claim 35 wherein the generation of control input values comprises:

generating a blue noise data stream; and selecting the control input values from the blue noise data stream.

37. The method of claim 36 wherein the blue noise data stream comprises a 2-D blue noise data stream.

38. The method of claim 29 wherein the generation of control input values comprises:

generating a quantum random number stream; and applying a blue noise filter to the quantum random number stream to generate a stream of control input values having a low-frequency pattern content lower than a predetermined threshold.

39. An apparatus comprising:

a coherent light source; and a phase modulation device which, includes a plurality of regions which provide independent amounts of phase shift according to respective input control values applied to each such region, and is coupled to the coherent light source so as to remain substantially in mechanical and rotational alignment with the coherent light source.

40. The apparatus of claim 39 further comprising:

a controller coupled to provide the input control values to the phase modulation device.

41. The apparatus of claim 40 wherein the controller comprises:

a blue noise generator.

42. The apparatus of claim 41 further comprising:

a content modulator; and a display device.

43. An apparatus comprising:

a phase modulator for despeckling an electromagnetic beam, the phase modulator having a plurality of regions which have individually controllable phase modulation;

a controller coupled to the phase modulator for providing a first phase modulation control input to a first of said regions and a second phase modulation control to a second of said regions; and a receiver device coupled to the phase modulator to receive the despeckled electromagnetic beam.

44. The apparatus of claim 43 wherein the electromagnetic beam is a laser beam and the apparatus comprises a targeted weapons system.

* * * * *